US006366371B1

(12) United States Patent
Kodama et al.

(10) Patent No.: US 6,366,371 B1
(45) Date of Patent: Apr. 2, 2002

(54) TRANSMISSIVELY VIEWABLE REFLECTION HOLOGRAM

(75) Inventors: Daijiro Kodama; Tsuyoshi Hotta, both of Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/535,157

(22) Filed: Mar. 24, 2000

(30) Foreign Application Priority Data

Apr. 2, 1999 (JP) ............................................. 11-096293
Jan. 28, 2000 (JP) ............................................. 12-020562

(51) Int. Cl.⁷ ................................................. G03H 1/22
(52) U.S. Cl. ............................................. 359/32; 359/1
(58) Field of Search ................................ 359/1, 13, 32, 359/15; 40/560

(56) References Cited

U.S. PATENT DOCUMENTS 5,455,693 A * 10/1995 Wreede et al. ................ 359/32

* cited by examiner

Primary Examiner—Darren Schuberg
(74) Attorney, Agent, or Firm—Dellett and Walters

(57) ABSTRACT

A transmission hologram allowing an illuminating light source for holographic reconstruction to be placed behind the hologram, i.e. on the side opposite to the viewing side, and permitting reconstruction of an image that is bright and clear and has low chromatic dispersion, which is the feature of the reflection type volume hologram. A transmissively viewable reflection hologram has a semitransparent reflecting mirror or a semitransparent reflecting layer placed at either side of a reflection type volume hologram member. The semitransparent reflecting mirror or the semitransparent reflecting layer is integral with or separate from the reflection type volume hologram member.

8 Claims, 5 Drawing Sheets

TRANSMISSIVELY VIEWABLE REFLECTION HOLOGRAM

BACKGROUND OF THE INVENTION

The present invention relates to a reflection hologram capable of being viewed by looking through it. More particularly, the present invention relates to a transmissively viewable reflection hologram which allows an illuminating light source for holographic reconstruction to be placed behind it.

Recently, holograms have been put to practical use actively, and both volume and relief holograms have been used for various applications.

The volume and relief holograms may be summarized as follows.

Volume holograms
  Reflection type: The
    The diffraction efficiency is high, and the angular selectivity and the wavelength selectivity are also high. A bright and clear color image can be reconstructed. However, an illuminating light source needs to be placed on the viewing side of the hologram. The illuminating light source may interfere with the design when the hologram is used for a shop-window advertisement (billboard) or the like.
  Transmission type:
    High chromatic dispersion occurs, and a color image is viewable only within a narrow angle range.
Relief holograms
  Reflection type:
    Because a transparent vacuum-evaporated film is provided on the reverse side thereof, the hologram is practically a transmission hologram. Accordingly, high chromatic dispersion occurs, and a color image is viewable only within a narrow angle range.
  Transmission type:
    High chromatic dispersion occurs because of a transmission hologram, and a color image is viewable only within a narrow angle range.

FIG. 5 is a graph showing comparatively the angular selectivity and wavelength selectivity of a transmission type volume hologram and a reflection type volume hologram [Toshihiro Kubota, "An Introduction to Holography", FIG. 2.17 (Asakura Shoten)]. It will be understood from the graph that the reflection type (Lippmann hologram) exhibits extremely high wavelength selectivity and has low chromatic dispersion in comparison to the transmission type, although these are the same in terms of the hologram structure, i.e. volume hologram.

It will be understood from the foregoing that it is desirable to use a reflection type volume hologram to reconstruct a bright and clear color three-dimensional image without introducing rainbow-like dispersion into the reconstructed image.

However, when a reflection type volume hologram is used, it is necessary in order to reconstruct the recorded image by using an illuminating light source to place the illuminating light source in front of the hologram, that is, on the viewing side of the hologram. Therefore, the illuminating light source may interfere with the viewer.

SUMMARY OF THE INVENTION

In view of the above-described problems associated with the prior art, an object of the present invention is to provide a transmission hologram which allows an illuminating light source for holographic reconstruction to be placed behind the hologram, i.e. on the side opposite to the viewing side, which permits reconstruction of an image that is bright and clear and has low chromatic dispersion, which is the feature of the reflection type volume hologram.

To attain the above-described object, the present invention provides a transmissively viewable reflection hologram including a reflection type volume hologram member and a semitransparent reflecting mirror or a semitransparent reflecting layer placed at either side of the reflection type volume hologram member. The semitransparent reflecting mirror or the semitransparent reflecting layer is integral with or separate from the reflection type volume hologram member.

In this case, the semitransparent reflecting mirror or the semitransparent reflecting layer may be placed at the illuminating light entrance side or the viewing side of the reflection type volume hologram member.

The distance or angle between the reflection type volume hologram member and the semitransparent reflecting mirror or the semitransparent reflecting layer may be adjustable.

The semitransparent reflecting mirror or the semitransparent reflecting layer may be variable in transmittance.

In the reflection hologram according to the present invention, a semitransparent reflecting mirror or a semitransparent reflecting layer is placed at either side of a reflection type volume hologram member such that the semitransparent reflecting mirror or the semitransparent reflecting layer is integral with or separate from the reflection type volume hologram member. Therefore, an illuminating light source for holographic reconstruction can be placed behind the reflection hologram, i.e. on the side opposite to the viewing side. Moreover, the hologram according to the present invention can be used as a transmission hologram capable of reconstructing an image that is bright and clear and has low chromatic dispersion, which is the feature of the reflection type volume hologram.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Embodiments of the transmissively viewable reflection hologram according to the present invention will be described below.

Figure 3:
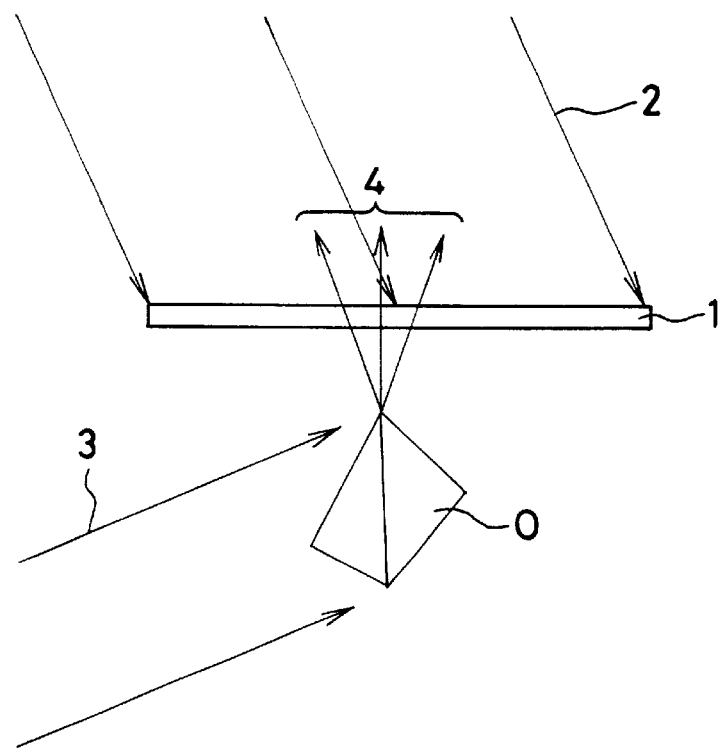
FIGS. 3(a) and 3(b) are diagrams for describing a method of photographically recording a reflection type volume hologram by the two-beam method and a method of replaying the holograms to reconstuct a holographic image.
Figure 3:
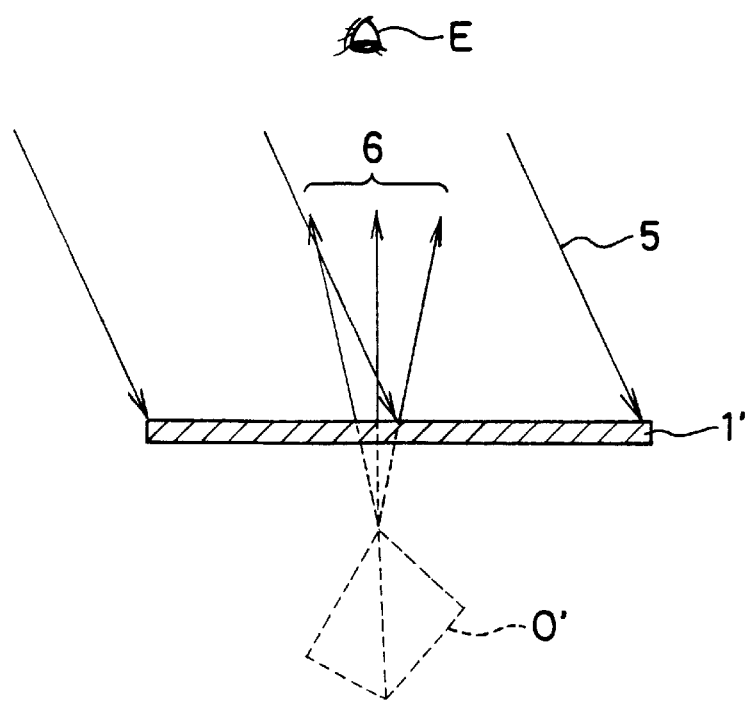
Figure 4:
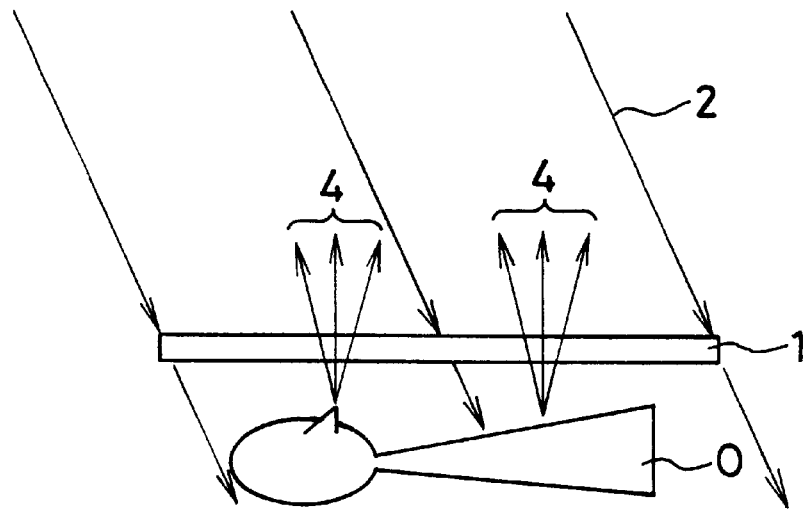
FIGS. 4(a) and 4(b) are diagrams for describing a method of photographically recording a reflection type volume hologram by the Denisyuk method and a method of replaying the hologram to reconstruct a holographic image.
Figure 4:
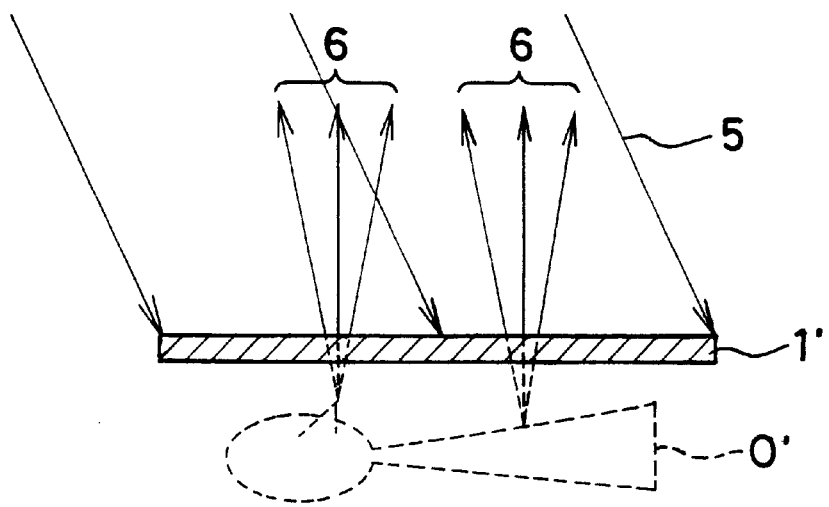
Figure 5:
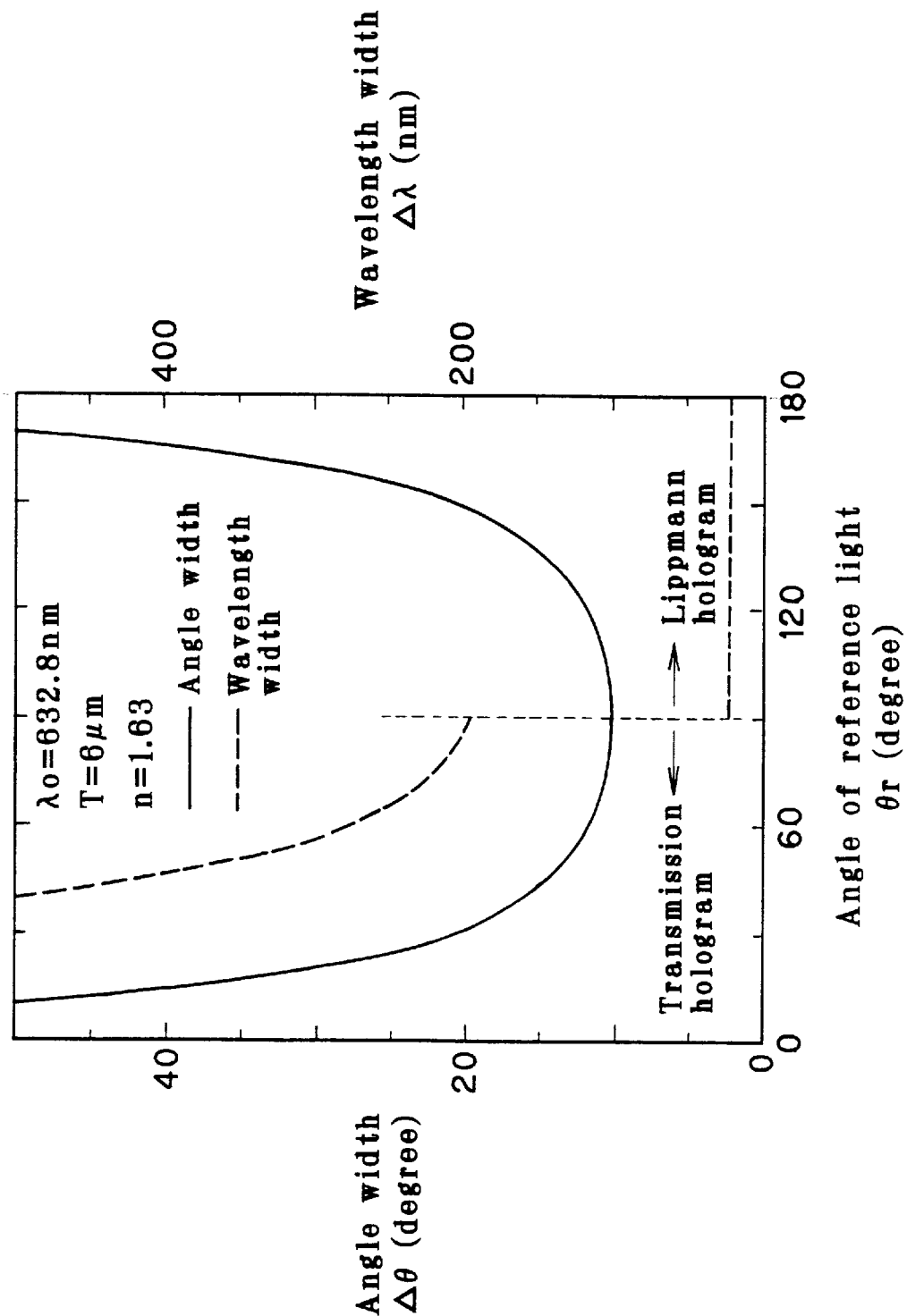
FIG. 5 is a graph showing comparatively the angular selectivity and wavelength selectivity of a transmission type volume hologram and a reflection type volume hologram.

First, the reflection type volume hologram will be described. There are two photographic recording methods for the reflection type volume hologram: the two-beam method, which is shown in FIG. 3; and the Denisyuk method, which is shown in FIG. 4. In either method, a volume hologram photosensitive material 1, e.g. a photopolymer, is used. In the two-beam method, as shown in part (a) of FIG. 3, the volume hologram photosensitive material 1 is placed in front of an object O, and reference light 2 is made incident on the volume hologram photosensitive material 1 from the front thereof at a predetermined incident angle. In addition, the object O is illuminated with illuminating light 3 coherent to the reference light 2. The illuminated object O produces scattered light 4. The scattered light 4 enters the volume hologram photosensitive material 1 from behind it. The scattered light 4 and the reference light 2 interfere with each other in the volume hologram photosensitive material 1. Thus, a reflection type volume hologram is recorded in the volume hologram photosensitive material 1. Assuming that the reflection type volume hologram is 1', as shown in part (b) of FIG. 3, when reconstruction illuminating light 5 including the same wavelength as that of the reference light 2 used for the recording is made incident on the reflection type volume hologram 1' from the same direction as the direction of incidence of the reference light 2, diffracted light 6 is produced. The diffracted light 6 forms a virtual image O' of the object O at the position where the object O was placed at the time of recording. Accordingly, when the reflection type volume hologram 1' is viewed with an eye E from the front thereof, the virtual image O' of the object O is seen as a three-dimensional image. If the reconstruction illuminating light 5 is made incident on the reflection type volume hologram 1' from a direction opposite to the direction of incidence of the reference light 2 at the time of recording, a real image of the object O is formed at the position where the object O was placed at the time of recording.

In the Denisyuk method, as shown in part (a) of FIG. 4, a volume hologram photosensitive material 1 is placed in front of an object O, and only reference light (illuminating light) 2 is made incident on the volume hologram photosensitive material 1 from the front thereof at a predetermined incident angle. The illuminating light 2 passes through the volume hologram photosensitive material 1 and is incident on the object O, which is placed behind the volume hologram photosensitive material 1. The object O produces scattered light 4 in the direction of reflection. The scattered light 4 and the illuminating light 2 interfere with each other in the volume hologram photosensitive material 1. Thus, a reflection type volume hologram of the object O is recorded in the volume hologram photosensitive material 1. Assuming that the reflection type volume hologram is 1', as shown in part (b) of FIG. 4, when reconstruction illuminating light 5 including the same wavelength as that of the illuminating light 2 used in the recording is made incident on the reflection type volume hologram 1' from the same direction as the direction of incidence of the illuminating light 2, diffracted light 6 is produced. The diffracted light 6 forms a virtual image O' of the object O at the position where the object O was placed at the time of recording. Accordingly, when the reflection type volume hologram 1' is viewed with an eye E from the front thereof, the virtual image O' of the object O is seen as a three-dimensional image. If the reconstruction illuminating light 5 is made incident on the reflection type volume hologram 1' from a direction opposite to the direction of incidence of the illuminating light 2 at the time of recording, a real image of the object O is formed at the position where the object O was placed at the time of recording.

In the present invention, a semitransparent reflecting mirror is placed at either side of a reflection type volume hologram 1' recorded by the arrangement as shown in FIG. 3 or 4.

Figure 1:
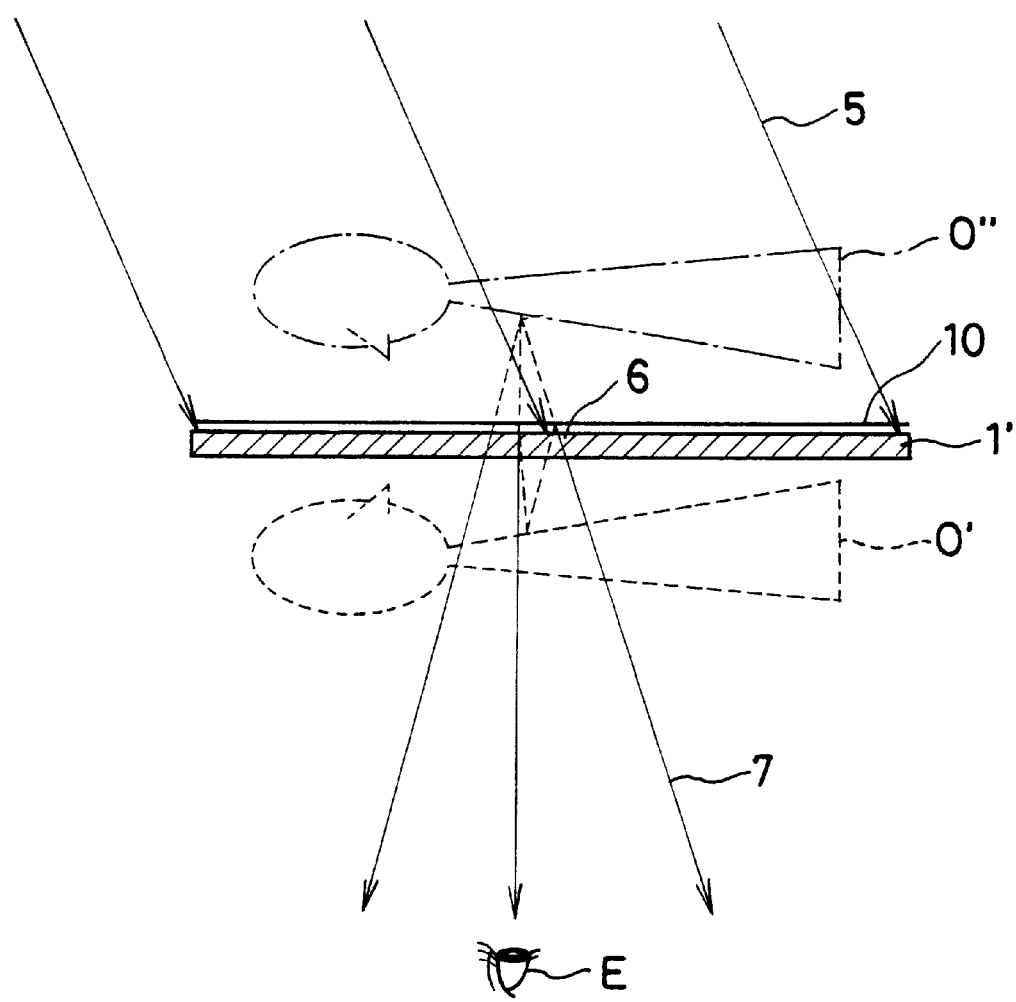
FIG. 1 is a diagram for describing the arrangement and operation of a first embodiment of the transmissively viewable reflection hologram according to the present invention.

In a first embodiment of the present invention, a semitransparent reflecting mirror is placed on the reconstruction illuminating light entrance side of a reflection type volume hologram 1' recorded by the arrangement as shown in FIG. 3 or 4. The arrangement of the first embodiment is shown in FIG. 1. In FIG. 1, a semitransparent reflecting mirror or semitransparent reflecting layer 10 is placed at a side of the reflection type volume hologram 1' from which reconstruction illuminating light 5 is incident on the reflection type volume hologram 1'. The semitransparent reflecting mirror or semitransparent reflecting layer 10 is integral with or slightly separate from the reflection type volume hologram 1'. With this arrangement, when reconstruction illuminating light 5 including the same wavelength as that of illuminating light 2 used to record the reflection type volume hologram 1' is made incident on the reflection type volume hologram 1' from a direction that is the same as or opposite to the direction of incidence of the illuminating light 2, the reconstruction illuminating light 5 is attenuated by the semitransparent reflecting mirror or semitransparent reflecting layer 10 by an amount corresponding to the reflectance thereof and then incident on the reflection type volume hologram 1'. Consequently, diffracted light 6 is produced in the opposite direction. The diffracted light 6 forms a virtual image O' of the object O at the position where the object O was placed at the time of recording. The diffracted light 6 is regularly reflected by the semitransparent reflecting mirror or semitransparent reflecting layer 10. The reflected light 6 passes through the reflection type volume hologram 1' and emerges as viewing light 7 to a side (transmission side) opposite to the reconstruction illuminating light entrance side. An image O" presented to the eye E by the viewing light 7 is a mirror image of the virtual image O' of the object O that is seen in the semitransparent reflecting mirror or semitransparent reflecting layer 10. The mirror image is an image in which the right and left are inverted. If the reconstruction illuminating light 5 is made incident on the reflection type volume hologram 1' from a direction opposite to the direction of incidence of the illuminating light 2 at the time of recording, the mirror image O" of the image O' is formed as a real image.

It should be noted that if the distance between the reflection type volume hologram 1' and the semitransparent reflecting mirror or semitransparent reflecting layer 10 is adjustable, it is possible to adjust the position where the mirror image O" is formed.

If the semitransparent reflecting mirror or semitransparent reflecting layer 10 is variable in transmittance, it is possible to adjust the brightness of the mirror image O".

Figure 2:
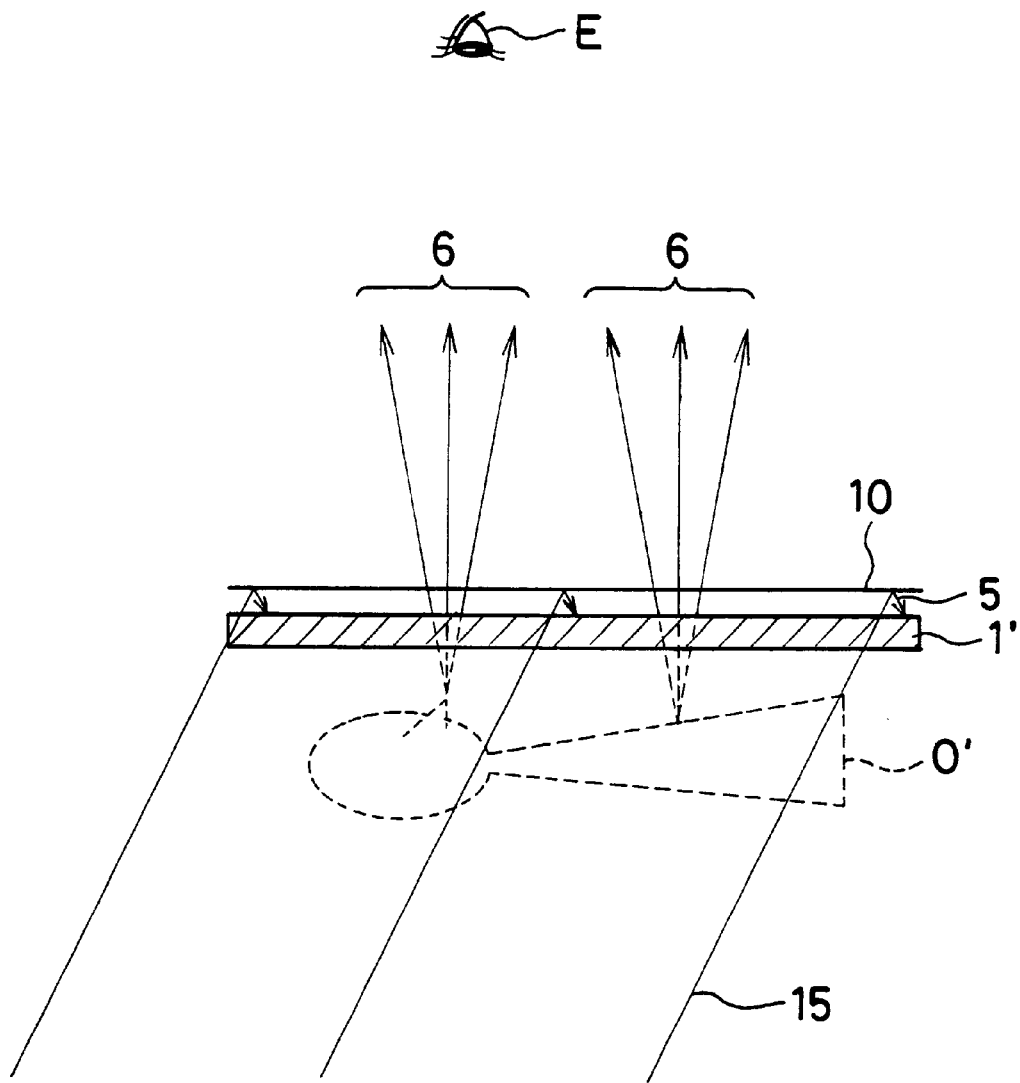
FIG. 2 is a diagram for describing the arrangement and operation of a second embodiment of the transmissively viewable reflection hologram according to the present invention.

In a second embodiment of the present invention, a semitransparent reflecting mirror is placed at the viewing side of a reflection type volume hologram 1' recorded by the arrangement as shown in FIG. 3 or 4. The arrangement of the second embodiment is shown in FIG. 2. In FIG. 2, a semitransparent reflecting mirror or semitransparent reflecting layer 10 is placed at the viewing side (eye E side) of the reflection type volume hologram 1'. The semitransparent reflecting mirror or semitransparent reflecting layer 10 is integral with or slightly separate from the reflection type volume hologram 1'. With this arrangement, when illuminating light 15 that includes the same wavelength as that for the recording and that passes through the reflection type volume hologram 1' without being diffracted is made incident on the reflection type volume hologram 1' from behind it, the illuminating light 15 is regularly reflected by the semitransparent reflecting mirror or semitransparent reflecting layer 10 on the viewing side while being attenuated by an amount corresponding to the transmittance of the semitransparent reflecting mirror or semitransparent reflecting layer 10. The reflected light 15 is incident on the reflection type volume hologram 1' as reconstruction illuminating light 5 from a direction that is the same as or opposite to the direction of incidence of the illuminating light 2 at the time of recording the reflection type volume hologram 1'. Consequently, diffracted light 6 is produced in the opposite direction. The diffracted light 6 forms a virtual image O' of the object O at the position where the object O was placed at the time of recording. The diffracted light 6 passes through the semitransparent reflecting mirror or semitransparent reflecting layer 10 while being attenuated by an amount corresponding to the reflectance thereof and emerges as viewing light to a side (transmission side) opposite to the reconstruction illuminating light entrance side. In this case, the image O' presented to the eye E by the viewing light is the reconstructed image itself of the reflection type volume hologram 1', but not a mirror image as in the arrangement shown in FIG. 1.

In this embodiment, the position where the image O' is formed cannot be adjusted even if the distance between the reflection type volume hologram 1' and the semitransparent reflecting mirror or semitransparent reflecting layer 10 is made adjustable. However, it is possible to give freedom for the direction of incidence of the illuminating light 15 by making the angle between the reflection type volume hologram 1' and the semitransparent reflecting mirror or semitransparent reflecting layer 10 adjustable.

If the semitransparent reflecting mirror or semitransparent reflecting layer 10 is variable in transmittance, it is possible to adjust the brightness of the mirror image O".

Although the transmissively viewable reflection hologram according to the present invention has been described above by way of embodiments, it should be noted that the present invention is not limited to the foregoing embodiments but can be modified in a variety of ways.

As will be clear from the foregoing description, in the transmissively viewable reflection hologram according to the present invention, a semitransparent reflecting mirror or a semitransparent reflecting layer is placed at either side of a reflection type volume hologram member such that the semitransparent reflecting mirror or the semitransparent reflecting layer is integral with or separate from the reflection type volume hologram member. Therefore, an illuminating light source for holographic reconstruction can be placed behind the reflection hologram, i.e. on the side opposite to the viewing side. Moreover, the hologram according to the present invention can be used as a transmission hologram capable of reconstructing an image that is bright and clear and has low chromatic dispersion, which is the feature of the reflection type volume hologram. The hologram according to the present invention is usable, for example, as a color filter of a liquid crystal display device, a graphic art hologram, etc.

What we claim is:

1. A transmissively viewable reflection hologram comprising:

a reflection type volume hologram member; and a semitransparent reflecting mirror placed at either side of said reflection type volume hologram member, the semitransparent reflecting mirror being integral with or separate from said reflection type volume hologram member.

2. A transmissively viewable reflection hologram according to claim 1, wherein the semitransparent reflecting mirror is placed at a viewing side of said reflection type volume hologram member.

3. A transmissively viewable reflection hologram according to any one of claim 1 or 2, wherein one of a distance and angle between said reflection type volume hologram member and the semitransparent reflecting mirror is adjustable.

4. A transmissively viewable reflection hologram according to claim 3, wherein the semitransparent reflecting mirror is variable in transmittance.

5. A transmissively viewable reflection hologram according to any one of claims 1 or 2, wherein the semitransparent reflecting mirror is variable in transmittance.

6. A transmissively viewable reflection hologram comprising:

a reflection type volume hologram member; and one of a semitransparent reflecting mirror and a semitransparent reflecting layer placed at either side of said reflection type volume hologram member, the semitransparent reflecting mirror or the semitransparent reflecting layer being integral with or separate from said reflection type volume hologram member, wherein the semitransparent reflecting mirror or the semitransparent reflecting layer is placed at an illuminating light entrance side of said reflection type volume hologram member.

7. A transmissively viewable reflection hologram according to claim 6, wherein one of a distance and angle between said reflection type volume hologram member and the semitransparent reflecting mirror or the semitransparent reflecting layer is adjustable.

8. A transmissively viewable reflection hologram according to any one of claims 6 or 7, wherein the semitransparent reflecting mirror or the semitransparent reflecting layer is variable in transmittance.

* * * * *